(12) United States Patent
Clough et al.

(10) Patent No.: US 10,450,433 B2
(45) Date of Patent: Oct. 22, 2019

(54) HYDROPHILIC FLUOROPLASTIC SUBSTRATES

(71) Applicant: 3M INNOVATIVE PROPERTIES COMPANY, St. Paul, MN (US)

(72) Inventors: Robert S. Clough, St. Paul, MN (US); Wenli Wang, Woodbury, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 32 days.

(21) Appl. No.: 15/895,528

(22) Filed: Feb. 13, 2018

(65) Prior Publication Data

US 2018/0171089 A1 Jun. 21, 2018

Related U.S. Application Data

(62) Division of application No. 14/787,573, filed as application No. PCT/US2014/040784 on Jun. 4, 2014, now Pat. No. 9,926,420.

(60) Provisional application No. 61/836,467, filed on Jun. 18, 2013.

(51) Int. Cl.
| | |
|---|---|
| C08J 7/18 | (2006.01) |
| C08F 259/08 | (2006.01) |
| B01D 67/00 | (2006.01) |
| B01D 71/32 | (2006.01) |
| C08J 9/36 | (2006.01) |
| D06M 10/08 | (2006.01) |

(52) U.S. Cl.
CPC ............ *C08J 7/18* (2013.01); *B01D 67/0093* (2013.01); *B01D 71/32* (2013.01); *C08F 259/08* (2013.01); *C08J 9/36* (2013.01); *D06M 10/08* (2013.01); *B01D 2323/02* (2013.01); *B01D 2323/385* (2013.01); *C08J 2205/042* (2013.01); *C08J 2327/12* (2013.01); *C08J 2351/00* (2013.01)

(58) Field of Classification Search
None
See application file for complete search history.

(56) References Cited

U.S. PATENT DOCUMENTS

| | | |
|---|---|---|
| 4,012,303 A | 3/1977 | D'Agostino |
| 4,482,685 A | 11/1984 | Chin |
| 4,539,256 A | 9/1985 | Shipman |
| 4,605,685 A | 8/1986 | Momose |
| 4,623,670 A | 11/1986 | Mutoh |
| 4,702,836 A | 10/1987 | Mutoh |
| 4,726,989 A | 2/1988 | Mrozinski |
| 4,867,881 A | 9/1989 | Kinzer |
| 5,120,594 A | 6/1992 | Mrozinski |
| 5,260,360 A | 11/1993 | Mrozinski |
| 5,597,456 A | 1/1997 | Maruyama |
| 5,804,263 A | 9/1998 | Goldberg et al. |
| 5,962,544 A | 10/1999 | Waller, Jr. |
| 6,096,293 A | 8/2000 | Stringer |
| 6,225,368 B1 | 5/2001 | D'Agostino |
| 6,447,920 B1* | 9/2002 | Chabrecek ............ C08F 290/00 427/164 |
| 6,559,192 B2 | 5/2003 | Maccone |
| 6,828,386 B2 | 12/2004 | MacKinnon |
| 7,067,058 B2 | 6/2006 | Yeh |
| 7,247,238 B2 | 7/2007 | Mullette |
| 7,338,692 B2 | 3/2008 | Smith |
| 7,553,417 B2 | 6/2009 | Waller, Jr. |
| 7,632,439 B2 | 12/2009 | Mullette |
| 7,671,112 B2 | 3/2010 | Hintzer |
| 7,989,566 B2 | 8/2011 | Coughlin |
| 7,999,049 B2 | 8/2011 | Coughlin |
| 9,272,245 B2 | 3/2016 | Yanagida |
| 2003/0129322 A1* | 7/2003 | Kunz ....................... B05D 3/06 427/535 |
| 2005/0045269 A1 | 3/2005 | Tateishi |
| 2006/0079594 A1 | 4/2006 | Stone |
| 2006/0228483 A1 | 10/2006 | Abidine |
| 2007/0231744 A1 | 10/2007 | Sasao |
| 2009/0176052 A1 | 7/2009 | Childs |
| 2010/0209693 A1 | 8/2010 | Hester |
| 2010/0210160 A1 | 8/2010 | Hester |
| 2011/0244013 A1 | 10/2011 | Mrozinski |
| 2012/0251927 A1 | 10/2012 | Sasao |
| 2012/0318730 A1 | 12/2012 | Tamai |
| 2013/0118975 A1 | 5/2013 | Waller, Jr. et al. |
| 2013/0224475 A1 | 8/2013 | Tagawa |

FOREIGN PATENT DOCUMENTS

| | | |
|---|---|---|
| CN | 102036740 | 4/2011 |
| JP | 2000-287559 | 10/2000 |
| JP | 2004-154613 | 6/2004 |
| JP | 2005-213516 | 8/2005 |
| JP | 2008-239874 | 10/2008 |
| JP | 2011-229734 | 11/2011 |
| WO | WO 2008-106323 | 9/2008 |

OTHER PUBLICATIONS

Franken, "Wetting Criteria for the Applicability of Membrane Distillation," Journal of Membrane Science, 1987, vol. 33, pp. 315-328.

Liu, "Surface Graft Copolymerization of Poly (vinylidene fluoride) Film with Simultaneous Lamination to Copper Foil," The Journal of Adhesion, 1999, vol. 71, pp. 35-54.

Takahashi, "Hydrophilic monomers suppress the adsorption of plasma protein onto a poly(vinvlidone fluoride) membrane," Molecular Medicine Reports, Sep. 5, 2009, vol. 2, pp. 749-752.

Zhou, "High throughput discovery of new fouling resistant surface", Journal of Material Chemistry, Nov. 8, 2011, vol. 21, pp. 693-704.

(Continued)

*Primary Examiner* — Krishnan S Menon

(57) ABSTRACT

Hydrophilic fluoroplastic substrates and methods of making hydrophilic fluoroplastic substrates from 4-acryloylmorpholine are disclosed.

25 Claims, No Drawings

(56) References Cited

OTHER PUBLICATIONS

International Search report for PCT International Application No. PCT/US2014/040784 dated Oct. 21, 2014, 5 pages.
"Basic Material Science and Radiation Technology", Zuoma HE, Shangond Education Press, pp. 310-314, published on Apr. 30, 2000.
"Modern Surface Engineering", Miaogen Qian, Shanghai Jiaotong University Press, pp. 373-375, published on Sep. 30, 2012.

* cited by examiner

HYDROPHILIC FLUOROPLASTIC SUBSTRATES

CROSS REFERENCE TO RELATED APPLICATIONS

This application is a divisional application of U.S. application Ser. No. 14/787,573, filed Oct. 28, 2015, which is a national stage filing under 35 U.S.C. 371 of PCT/US2014/040784, filed Jun. 4, 2014, which claims priority to U.S. Provisional Application No. 61/836,467, filed Jun. 18, 2013, the disclosure of which is incorporated by reference in its/their entirety herein.

TECHNICAL FIELD

The present disclosure relates to hydrophilic fluoroplastic substrates, and methods for preparing the same. In one embodiment such hydrophilic fluoroplastic substrates may be used as filtration media.

SUMMARY

There is a need in the art for fluoroplastic substrates having enhanced hydrophilicity. Further, there is a need in the art for a method of making fluoroplastic substrates having enhanced hydrophilicity. Further, there is a need in the art for a method of making porous fluoroplastic substrates having enhanced hydrophilicity while maintaining or increasing the flux of liquids through the substrate.

The present disclosure is directed to hydrophilic substrates and methods of making hydrophilic substrates. More specifically, the hydrophilic substrates include a fluoroplastic substrate that has been surface-treated to provide the requisite hydrophilicity.

In one aspect, a method of treating a fluoroplastic substrate is described comprising:
(a) providing a fluoroplastic substrate comprising a polymer having a structural unit selected from —CHF—, —CH$_2$CF$_2$—, or —CF$_2$CH$_2$—;
(b) contacting the fluoroplastic substrate with a composition comprising 4-acryloylmorpholine; and
(c) exposing the fluoroplastic substrate to a controlled amount of ionizing radiation selected from at least one of e-beam, x-ray, and gamma radiation so as to form a surface treatment on the fluoroplastic substrate comprising a grafted, radiation-initiated reaction product of the composition comprising 4-acryloylmorpholine attached to the surfaces of the fluoroplastic substrate In another aspect, an article is described comprising: a porous fluoroplastic substrate comprising a polymer having a structural unit selected from —CHF—, —CH2CF2-, or —CF2CH2- and having interstitial and outer surfaces; and a surface-treatment thereon the porous fluoroplastic substrate, wherein the surface-treatment is a grafted reaction product of a composition comprising 4-acryloylmorpholine.

In yet another aspect, an article is described comprising: a fluoroplastic substrate comprising a polymer having a structural unit selected from —CHF—, —CH$_2$CF$_2$—, or —CF$_2$CH$_2$—; and a surface-treatment thereon the fluoroplastic substrate, wherein the surface-treatment is a grafted reaction product of a composition comprising 4-acryloylmorpholine and a second monomer.

In yet another aspect, a method of filtering a liquid is described comprising the surface-treated fluoroplastic substrate described herein.

In yet another aspect, a graft copolymer composition is described comprising a fluoropolymer that is grafted to at least one of: monomer, oligomer, and polymer formed from a monomer comprising 4-acryloylmorpholine; wherein the fluoropolymer is formed from monomers comprising (i) ethylene and chlorotrifluoroethylene, (ii) ethylene and tetrafluoroethylene, or (iii) tetrafluoroethylene, hexafluoropropylene, and vinylidene fluoride.

These and other features and advantages of the present invention will become apparent after a review of the following detailed description of the disclosed embodiments and the appended claims.

DETAILED DESCRIPTION

As used herein, the term
"a", "an", and "the" are used interchangeably and mean one or more;
"and/or" is used to indicate one or both stated cases may occur, for example A and/or B includes, (A and B) and (A or B);
"copolymer" means a polymer comprising repeating units derived from at least two different monomers and includes copolymers, terpolymers, etc.; and
"homopolymer" means a polymer comprising repeating units derived from one monomer.

Also herein, recitation of ranges by endpoints includes all numbers subsumed within that range (e.g., 1 to 10 includes 1.4, 1.9, 2.33, 5.75, 9.98, etc.).

Also herein, recitation of "at least one" includes all numbers of one and greater (e.g., at least 2, at least 4, at least 6, at least 8, at least 10, at least 25, at least 50, at least 100, etc.).

Fluoroplastics are an attractive choice for applications requiring temperature, chemical, and/or environmental resistance. However, the low surface energies of these materials can be detrimental in some applications. Therefore, the present disclosure is directed toward providing a surface treatment to the fluoroplastic substrate to improve its hydrophilicity.

Monomers may be grafted onto polymer base substrates to improve the properties of the base substrate. For example U.S. Pat. No. 6,828,386 (MacKinnon) discloses exposing a polymeric base material to a dose of ionizing radiation, and then contacting the irradiated base material with a microemulsion comprising a fluorostyrenic monomer to prepare ion exchange membranes, while U.S. Pat. Publ. Nos. 2010/0209693 and 2010/0210160 (Hester et al.) disclose a base substrate and a gamma radiation-initiated product of a monomer comprising a (meth)acrylated group and at least one additionally free-radically polymerizable group to prepare hydrophilic porous articles.

In the present disclosure, articles and methods are described wherein hydrophilic articles are provided by a process of ionizing (i.e., gamma, x-ray, and/ore-beam) radiation-initiated grafting of a free-radically polymerizable monomer, 4-acryloylmorpholine (also known as N-acryloylmorpholine) onto a fluoroplastic substrate. The hydrophilic article of the present disclosure comprises a number of components including, but not limited to, (1) a fluoroplastic substrate and (2) an ionizing radiation-initiated reaction product of a composition comprising 4-acryloylmorpholine.

Fluoroplastic Substrate

The base substrate is a fluoroplastic (i.e., a plastic that includes fluorine atoms). In the present disclosure, the fluoroplastic substrate comprises a polymer with a repeating structural unit selected from at least one of: —CHF—, —CH₂CF₂—, or —CF₂CH₂—, wherein repeating in this context means the structural unit is present multiple times in or along the polymer chain. In other words, the fluoroplastic substrate comprises at least 5, 10, 20, or even 100 structural units selected from at least one of: —CHF—, —CH₂CF₂—, or —CF₂CH₂— in the polymer chain. In one embodiment, at least 5, 10, 15, 20, 30, 40, 50, 60, 70, 80, 90, 95, 98, or 99 wt. % of the polymer will comprise structural units selected from at least one of: —CHF—, —CH₂CF₂—, or —CF₂CH₂—. Such structural units are derived from the polymerization of various monomers. For example: the polymerization of vinyl fluoride; the polymerization of vinylidene fluoride; the copolymerization of a hydrocarbon olefin (such as ethylene and/or propylene) and fluorinated monomers (such as chlorotrifluoroethylene, tetrafluoroethylene, and/or hexafluoropropylene). Homopolymers and copolymers of vinylidene fluoride; homopolymers and copolymers of vinyl fluoride; copolymers of hydrocarbon olefins (such as ethylene and/or propylene) and fluorinated monomers (such as chlorotrifluoroethylene, hexafluoropropylene, tetrafluoroethylene, perfluorinated allyl ethers, and/or perfluorinated vinyl ethers); and homopolymers and copolymers comprising fluorinated monomers all possess such structural units. Alternatively, the fluoroplastic substrate comprises at least 5, 10, 20, or even 100 structural units selected from at least one of: —CHF—, —CH₂CFX—, or —CFXCH₂— in the polymer chain, wherein X is Cl or F. In one embodiment, at least 5, 10, 15, 20, 30, 40, 50, 60, 70, 80, 90, 95, 98, or 99 wt. % of the polymer will comprise structural units selected from at least one of: —CHF—, —CH₂CFX—, or —CFXCH₂—, wherein X is Cl or F. Exemplary fluoroplastic substrates include, ECTFE (a copolymer of ethylene and chlorotrifluoroethylene), ETFE (a copolymer of ethylene and tetrafluoroethylene), THV (a terpolymer of tetrafluoroethylene/hexafluoropropylene/vinylidene fluoride), VDF-CTFE (a copolymer of vinylidene fluoride and chlorotrifluoroethylene), and polyvinylidene fluoride (PVDF). In one embodiment of the present disclosure, the fluoroplastic substrate is not polyvinylidene fluoride (PVDF).

The fluoropolymers of the fluoroplastic substrate can be synthesized by various methods including solution, dispersion, and most commonly, emulsion polymerization as known in the art. Typically, the polymerization is a free radical, addition polymerization reaction. The copolymerization of ethylene with chlorotrifluoroethylene or tetrafluoroethylene is known to occur by predominantly an alternating mechanism wherein the addition of an ethylene monomer and chlorotrifluoroethylene or tetrafluoroethylene alternates. In addition to the fluoropolymers, the fluoroplastic substrate can contain initiators and their fragments, processing aids, antioxidants, and surfactants, such as the alkali metal salts of perfluorooctanoic acid or other fluorinated surfactants as described in U.S. Pat. No. 4,482,685 (Chandrasekaran et al.), U.S. Pat. No. 7,989,566 (Coughlin et al.), U.S. Pat. No. 7,999,049 (Coughlin et al.), and U.S. Pat. No. 7,671,112 (Dadalas et al.).

The fluoroplastic substrate is not particularly limited in thickness, but it depends on the application. For example, if the treated fluoroplastic substrate is to be used as a filtration membrane, the thickness of the fluoroplastic substrate should be kept reasonably thin to limit the amount of pressure drop during the filtration. In one embodiment, the fluoroplastic substrate has a thickness of at least about 10 micrometers (µm), 25 µm, 50 µm or even 75 µm; and no more than 250 µm, 400 µm, 500 µm, 750 µm, 1000 µm, 1.5 millimeters (mm), 5 mm, or even 1 centimeter.

The fluoroplastic substrate may be in any form such as a film, a fiber, a hollow fiber, a tube, a particle, a pellet, or a sheet. The fluoroplastic substrate may be incorporated into various configurations, such as rolls, cylinders, cones, flat discs, pleated sheets, or spiral wound.

In one embodiment, the fluoroplastic substrate is dense or nonporous.

In another embodiment, the fluoroplastic substrate is porous, meaning that the fluoroplastic substrate comprises a series of interconnected pores from a first major surface of the fluoroplastic substrate to an opposing second major surface of the fluoroplastic substrate. The porous fluoroplastic substrate comprises outer surfaces as well as interstitial surfaces which can comprise the gamma, x-ray, and/or e-beam radiation-initiated reaction product of the composition comprising 4-acryloylmorpholine. Such porous fluoroplastic substrates include porous films and nonwovens. In one exemplary embodiment, the porous fluoroplastic substrate has an average pore size that is greater than about 5 nanometers (nm), 10 nm, 20 nm, 50 nm, or even 100 nm; and less than about 30 µm, 25 µm, 20 µm, 15 µm, 10 µm, 5 µm, 2 µm, 1.5 µm, 1 µm, 800 nm, 700 nm, 500 nm or even 300 nm.

In some embodiments, the substrate is a porous membrane such as a thermally-induced phase separation (TIPS) membrane. TIPS membranes are often prepared by forming a homogenous solution of a thermoplastic material and a diluent, and optionally including a nucleating agent, by mixing at elevated temperatures in plastic compounding equipment, e.g., an extruder. The solution can be shaped by passing through an orifice plate or extrusion die, and upon cooling, the thermoplastic material crystallizes and phase separates from the diluent. The crystallized thermoplastic material is often stretched. The diluent is optionally removed either before or after stretching, leaving a porous polymeric structure. Porous membranes are further disclosed in U.S. Pat. No. 4,539,256 (Shipman), U.S. Pat. No. 4,726,989 (Mrozinski), U.S. Pat. No. 4,867,881 (Kinzer), U.S. Pat. No. 5,120,594 (Mrozinski), U.S. Pat. No. 5,260,360 (Mrozinski et al.), U.S. Pat. No. 5,962,544 (Waller), and U.S. Pat. No. 6,096,293 (Mrozinski et al.) all of which are assigned to 3M Company (St. Paul, Minn.), and each incorporated herein by reference. Useful ECTFE membranes may be prepared according to U.S. Pat. No. 4,623,670 (Miura et al.); U.S. Pat. No. 4,702,836 (Miura et al.); U.S. Pat. No. 6,559,192 (Maccone et al.); and U.S. Pat. No. 7,247,238 (Muller et al.); and U.S. Publ. No. 2011/0244013 (Mrozinski et al.).

Some exemplary TIPS membranes comprise poly(vinylidene fluoride) (PVDF), and copolymers of ethylene/chlorotrifluoroethylene (ECTFE). For some applications, a TIPS membrane comprising ECTFE is particularly desirable. TIPS membranes comprising ECTFE are further described in U.S. Publ. No. 2011/0244013 (Mrozinski et al.), incorporated herein by reference. For some applications, a TIPS membrane comprising PVDF is particularly desirable. TIPS membranes comprising PVDF are further described in U.S. Pat. No. 7,338,692, (Smith et al.), incorporated herein by reference.

In some embodiments, the substrate is a porous membrane such as a solvent-induced phase separation (SIPS) membrane. SIPS membranes are often made by preparing a homogeneous solution of a polymer in first solvent(s), casting the solution into desired shape, e.g. flat sheet or hollow fiber, contacting the cast solution with another second solvent that is a non-solvent for the polymer, but a solvent for the first solvent (i.e., the first solvent is miscible with the second solvent, but the polymer is not). Phase separation is induced by diffusion of the second solvent into the cast polymer solution and diffusion of the first solvent out of the polymer solution and into the second solvent, thus precipitating the polymer. The polymer-lean phase is removed and the polymer is dried to yield the porous structure. SIPS is also called Phase Inversion, or Diffusion-induced Phase Separation, or Nonsolvent-induced Phase Separation, such techniques are commonly known in the art. Porous PVDF substrates can be made via a SIPS process, as PVDF dissolves in common organic solvents.

In one embodiment, a combination of a TIPS process and a SIPS process is used to prepare a porous substrate. See for example, U.S. Pat. No. 7,632,439 (Mullette et al.), which discloses a process for making ECTFE, which is incorporated herein by reference.

Useful porous substrates include symmetric, asymmetric, or multizone membranes, as well as multiple layers of such membranes. A symmetric membrane is one having substantially the same average pore size and/or porosity throughout its thickness. An asymmetric membrane is a membrane having a linear or non-linear gradient in average pore size and/or porosity extending from one major surface to an opposing major surface of the fluoroplastic substrate. In other words, the ratio of the average pore size of the one major surface with the larger pores to the average pore size of the opposing surface is greater than 3 or even greater than 4. A multizone membrane is a membrane having two or more substantially distinct through-thickness zones, or layers having different average pore sizes and/or different porosities. Multizone membranes are often designated by the number of layers or zones, (e.g. a 2-zone membrane has two substantially distinct zones having different average pore sizes or different porosities).

In other embodiments, the fluoroplastic substrate is a nonwoven web, which may include nonwoven webs manufactured by any of the commonly known processes for producing nonwoven webs. As used herein, the term "nonwoven web" refers to a fabric that has a structure of individual fibers or filaments which are randomly and/or unidirectionally interlaid in a mat-like fashion. For example, the fibrous nonwoven web can be made by carded, air laid, spunlaced, spunbonding or melt-blowing techniques or combinations thereof. Spunbonded fibers are typically formed by extruding molten thermoplastic polymer as filaments from a plurality of fine, usually circular capillaries of a spinneret with the diameter of the extruded fibers being rapidly reduced. Meltblown fibers are typically formed by extruding the molten thermoplastic material through a plurality of fine, usually circular, die capillaries as molten threads or filaments into a high velocity, usually heated gas (e.g. air) stream, which attenuates the filaments of molten thermoplastic material to reduce their diameter. Thereafter, the meltblown fibers are carried by the high velocity gas stream and are deposited on a collecting surface to form a web of randomly disbursed meltblown fibers. Any of the nonwoven webs may be made from a single type of fiber or two or more fibers that differ in the type of thermoplastic polymer, thickness thereof, or both.

Useful porous fluoroplastic substrates of the present disclosure include those made from PVDF, ETFE, ECTFE, and VDF-CTFE.

Composition

The composition of the present disclosure comprises the grafting monomer 4-acryloylmorpholine, also referred to as N-acryloylmorpholine.

In one embodiment, the composition further comprises at least one second monomer selected from free radically polymerizable, ethylenically unsaturated compounds, such as acrylates, methacrylates, acrylic acids, methacrylic acids, acrylamides, methacrylamides, N-vinyl amides, vinyl esters, styrenes, dienes, and combinations thereof.

In some embodiments, the 4-acryloylmorpholine can improve the performance of the surface treatment (e.g., increase the critical surface tension of a surface-treated substrate, increase the CWST of a surface-treated porous substrates as defined in the test methods of the Examples section, decrease the amount of time to pass a given volume of liquid through a surface-treated porous substrate, i.e., increase the flux, and/or decrease the static contact angle of a drop of water on a surface-treated substrate) of the second monomer.

In another embodiment, the second monomer can interact synergistically with the 4-acryloylmorpholine, achieving improved performance compared to the individual monomer alone. Such an exemplary monomer includes diacetone acrylamide, also known as N-(1,1-dimethyl-3-oxobutyl) acrylamide. In one embodiment of the present disclosure, the composition comprises 4-acryloylmorpholine and diacetone acrylamide, wherein the weight percent of the diacetone acrylamide based on the total weight of the 4-acryloylmorpholine and diacetone acrylamide is greater than 0, 1, 5, 10, or even 20%; and no more than 70, 60, 55, 50, 45, or even 40%.

In one embodiment, the composition comprises at least one additive, such as a chain transfer agent, an anti-oxidant, a surfactant, and combinations thereof. Chain transfer agents control the molecular weight of the resultant polymer. They act to terminate the polymerization process for a forming polymer, causing the polymer to have a shorter chain length, and thus a lower molecular weight, than it might otherwise have. In general, the more chain transfer agent added, the lower the molecular weights of the resulting polymers. Examples of useful chain transfer agents include, but are not limited to, those selected from the group consisting of chlorine, bromine, and iodine containing compounds, isopropyl alcohol, mercaptans, amines, and mixtures thereof. The preferred chain transfer agents are isopropanol, mercaptans such as isooctylthioglycolate and carbon tetrabromide. In one embodiment, the composition may comprise up to 0.5 parts by weight of a chain transfer agent, typically about 0.02 to about 0.15 parts by weight, preferably about 0.02 to about 0.1 parts by weight, most preferably 0.03 to about 0.07 parts by weight, based upon 100 parts by weight of the total of the composition. In one embodiment, the composition may comprise about 0.005 to 5 parts of an anti-oxidant based upon 100 parts by weight of the total of the composition. In one embodiment, the composition may comprise about 0.005 to 5 parts of a surfactant based upon 100 parts by weight of the total of the composition.

In one embodiment, the 4-acryloylmorpholine, and optional second monomer, and optional additive may be dissolved and/or suspended in one or more solvents wherein a solvent is selected from an organic solvent and/or water. The solvents should be chosen so that the monomers dissolve or disperse. Examples of useful solvents include, but are not limited to, those selected from the group consisting of ketones, alcohols, ethers, esters, amides, hydrocarbons, halogenated hydrocarbons, halocarbons, water, and mixtures thereof. Preferred solvents are those that undergo relatively little chain transfer with radical species, such as the solvents of methanol and water, and their mixtures. In one embodiment, the composition may comprise about at least 40, 50, 60, 70, 75, 80, and at most 90, 95, and 99 wt. % of a solvent based on the total weight of the composition. Solvents (and any ungrafted materials) can be removed from the treated substrate by extraction or rinsing with solvent or drying or both. Drying can be accomplished at ambient conditions or at elevated temperatures and pressures below or above atmospheric pressure. Impingement of gases such as air or nitrogen can be used to dry.

As used herein "composition" and "composition comprising 4-acryloylmorpholine" are used interchangeably to mean inclusion of the 4-acryloylmorpholine along with any additional components including second monomers, additives, and solvents, unless otherwise specified. In one embodiment, the total concentration of the monomers in the composition ranges from about at least 1, 5 or even 10 wt. %; and at most 20, 25, 30, 40, 50, or even 60 wt. % based on a total weight of the composition.

In the present disclosure, a monomer (e.g., 4-acryloylmorpholine) has been found to unexpectedly achieve improved hydrophility of a fluoroplastic substrate as compared to monomers that are more polar and/or have larger solubility parameters (e.g., Hansen solubility parameter). For example, solubility parameters are related to cohesive energy density, and generally, the greater the solubility parameter, the greater the cohesive energy density, and the greater the surface tension. Thus, one would expect surfaces grafted with monomer having a higher solubility parameter to have, for example, higher critical surface tension.

In general, fluorocarbons have much lower dispersive forces than hydrocarbons and the two are not compatible. However, the fluoroplastic substrates of the present disclosure have both fluorocarbon and hydrocarbon content. Without wishing to be bound by theory it is believed that the fluorocarbon and hydrocarbon content increases the dispersive forces relative to perfluorinated materials and also provides dipoles and hydrogen bonding sites for potential interaction. As can be seen in the Example Section below, 4-acryloylmorpholine appears to possess the proper balance of dispersive, polar, and hydrogen bonding elements to both foster adsorption to and possibly plasticization of the fluoroplastic surface and, once grafted, provides a hydrophilic surface.

In the present disclosure, the resultant hydrophilic articles comprise a fluoroplastic substrate and an ionizing radiation-initiated reaction product of the composition comprising 4-acryloylmorpholine. This ionizing radiation-initiated reaction product of the composition comprising 4-acryloylmorpholine can be thought of as a second layer grafted on top of the fluoroplastic substrate. This second layer is conforming to the surface of the fluoroplastic substrate and it may be continuous or discontinuous across the surface of the fluoroplastic substrate.

In one embodiment, when the fluoroplastic substrate is nonporous, the surface treatment (or second layer) is continuous across the surface of the fluoroplastic substrate (in other words, at least 85, 90, 95, 99, or even 100% of the surface, which was contacted with the composition comprises a gamma, x-ray, and/or e-beam radiation-initiated reaction product of the composition).

When discussing porous fluoroplastic substrates, a substantial portion of the surfaces (including the outer and interstitial surfaces) of the porous fluoroplastic substrates may comprise the surface treatment (or second layer) for example at least 65, 70, 75, 80, 85, 90, 95, 99, or even 100% of the surfaces comprise an ionizing radiation-initiated reaction product of the composition.

In one embodiment, the surface-treated fluoroplastic substrate comprises an additional layer. This additional layer is in direct contact with the surface-treated fluoroplastic substrate. In one embodiment, the additional layer is provided on the side of the fluoroplastic substrate opposite the surface treatment. In another embodiment, the additional layer is provided on the same side as the surface treatment. The additional layer may be a coating applied to the surface-treated substrate that is adhered to surface-treated substrate. Such additional layers may be used, for example, to provide mechanical support to the surface-treated fluoroplastic substrate, temporarily protect a surface of the surface-treated fluoroplastic substrate (e.g., between manufacture and point of use), and/or to provide additional performance features to the surface-treated fluoroplastic substrate. For example, in one embodiment, when the articles are porous, the surface-treated, porous fluoroplastic substrate comprises an additional porous layer such as a non-woven. The pores of the additional layer are larger than the pores of the fluoroplastic substrate. This article could be used in a filtration system, wherein the liquid to be filtered is first passed through the additional porous layer and then passed through the surface-treated fluoroplastic substrate or alternatively, wherein the liquid to be filtered is first passed through the surface-treated fluoroplastic substrate and then passed through the additional porous layer.

Because the grafting of the composition onto the fluoroplastic substrate results in a more hydrophilic surface that improves the fluoroplastic substrate's wettability by aqueous and hydrocarbon liquids, in one embodiment of the present disclosure, the outer surface (or major surface) of the surface-treated fluoroplastic substrate comprising the reaction product of the composition comprising 4-acryloylmorpholine is substantially free of an additional layer, for example a metal foil, or other non-porous layer that would preclude wetting of the surface-treated fluoroplastic surface with liquids. In other words, the composition comprising the 4-acryloylmorpholine is used to make the surface of the fluoroplastic substrate hydrophilic and not act as an adhesion promoter between the fluoroplastic substrate and an additional layer.

Method of Making

The resultant hydrophilic substrates of the present disclosure may be prepared using a combination of process steps.

In one embodiment, the method comprises:
1) providing a fluoroplastic substrate,
2) contacting the fluoroplastic substrate with a composition comprising 4-acryloylmorpholine,
3) exposing the fluoroplastic substrate comprising the composition to a controlled amount of ionizing radiation so as to form a surface treatment on the fluoroplastic substrate comprising a grafted, radiation-initiated reaction product of the composition comprising 4-acryloylmorpholine attached to the surfaces of the fluoroplastic substrate.

In this method, the fluoroplastic substrate is contacted with the composition prior to the irradiation step. As long as the composition does not evaporate, the substrate comprising the composition may be held for more than an hour or even days before exposure to the radiation. If a continuous process is employed, the irradiation step may more typically occur within minutes or even seconds after contacting the fluoroplastic substrate with the composition.

In another embodiment, the method comprises:
1) providing a fluoroplastic substrate,
2) exposing the fluoroplastic substrate to a controlled amount of ionizing radiation, and
3) contacting the fluoroplastic substrate with a composition comprising 4-acryloylmorpholine so as to form a surface treatment on the fluoroplastic substrate comprising a grafted, radiation-initiated reaction product of the composition comprising 4-acryloylmorpholine attached to the surfaces of the fluoroplastic substrate.

In this method, the fluoroplastic substrate is first exposed to the ionizing radiation and then contacted with the composition comprising the 4-acryloylmorpholine. Typically the irradiated fluoroplastic substrate is contacted with the composition within an hour, preferably within minutes or even within seconds after being irradiated.

In the contacting steps mentioned above, the fluoroplastic substrate is contacted with the composition comprising the 4-acryloylmorpholine. Suitable methods of contact include, but are not limited to, spray coating, flood coating, knife coating, Meyer bar coating, dip coating, and gravure coating. When using porous fluoroplastic substrates, often, the porous fluoroplastic substrate is saturated with the composition, to enable the grafting monomers time to diffuse into the porous network of the substrate, enabling a surface-treatment of the interstitial surfaces throughout the thickness of the fluoroplastic substrate. However, in one embodiment, only a portion of the thickness of the porous fluoroplastic substrate comprises surface-treatment of the interstitial surfaces, due to, for example, insufficient saturating time, difficulty in diffusing the composition through the interconnected pore network, or the desire to only surface-treat a portion of fluoroplastic substrate. When using a nonporous fluoroplastic substrate, either a first major surface of the fluoroplastic substrate may be contacted with the composition (yielding a single-sided hydrophilic fluoroplastic substrate) or both the first major surface and the opposing second major surface may be contacted with the composition (yielding a dual-sided hydrophilic fluoroplastic substrate).

The composition remains in contact with the fluoroplastic substrate for a time sufficient for the radical sites to initiate polymerization with the grafting monomers and complete the grafting process. As a result, the surface-treated fluoroplastic substrate comprises grafted monomers, oligomers (typically no more than 100 monomer units), and polymers (greater than 100 monomer units) attached to the surfaces thereof.

In the method of the present disclosure, it is desirable to remove the presence of oxygen so as not to hinder the free radical polymerization of the grafting monomers (e.g., 4-acryloylmorpholine and optional second monomer). This can be accomplished by controlling the environment during the process to minimize the amount of oxygen present.

In one embodiment of the present disclosure, the fluoroplastic substrate and the composition are sandwiched (i.e., positioned) between a removable carrier layer and a removable cover layer to form multilayer sandwich structure. Removable cover layer and removable carrier layer may comprise any inert sheet material that is capable of providing temporary protection to the fluoroplastic substrate and composition from direct exposure to oxygen. Suitable inert sheet materials for forming removable cover layer and removable carrier layer include, but are not limited to, polyethylene terephthalate film material, other aromatic polymer film materials, and any other polymer film material that exhibits a reduced ability to generate free radicals upon irradiation with the ionizing radiation. Once assembled, the multilayer sandwich structure comprising the fluoroplastic substrate and the composition comprising the 4-acryloylmorpholine proceed to the irradiation step. After exposure to radiation, the removable carrier layer and the removable cover layer are allowed, but not required, to remain on the surface-treated fluoroplastic substrate for a period of time prior to removal so as to provide prolonged protection of surface-treated fluoroplastic substrate from exposure to oxygen. Desirably, removable carrier layer and removable cover layer remain on surface-treated fluoroplastic substrate for at least 15, 30, or even 60 seconds after being irradiated. In one embodiment, the removable carrier layer and/or removable cover layer can remain intact with the surface-treated fluoroplastic substrate for an extended time period as would be the case if batch processing rolls of multilayer sandwich structure are prepared. Exclusion of oxygen in a multilayer sandwich allows free radical chemistry to continue after radiation exposure for a duration sufficient to improve the grafting yield. The removable carrier layer and/or removable cover layer can be removed and the surface-treated fluoroplastic substrate can proceed to optional steps, including washing/rinsing, drying, and/or heating or further treatment of the grafted surface of the fluoroplastic substrate. This method works particularly well in batch processing where the composition is contacted with the fluoroplastic substrate prior to irradiation.

In another embodiment of the present disclosure, the fluoroplastic substrate is exposed to the radiation in an inert atmosphere. Generally, the fluoroplastic substrate is placed in a chamber purged of oxygen. Typically, the chamber comprises an inert atmosphere such as nitrogen, carbon dioxide, helium, argon, etc. with a minimal amount of oxygen, which is known to inhibit free radical polymerization. Following irradiation, the fluoroplastic substrate is transported in an inert environment and contacted with the composition, where it is again stored in an inert environment and allowed to react.

The irradiation step involves the irradiation of substrate surfaces with ionizing radiation to prepare free radical reaction sites on such surfaces upon which the monomers are subsequently grafted. "Ionizing radiation" means e-beam, gamma, and x-ray radiation of a sufficient dose and energy to cause the formation of free radical reaction sites on the surface(s) of the fluoroplastic substrate. The radiation is of sufficiently high energy that when absorbed by the fluoroplastic substrate, chemical bonds in the substrate are cleaved and free radical sites generated. Free radical sites on the surface of the substrate can react with the carbon-carbon double bond of 4-acryloylmorpholine (or optional second monomer), which can continue to add 4-acryloylmorpholine (or optional second monomer) via a free radical, addition (or chain) polymerization. Other reactions are also possible. For example, when the composition and substrate are in contact during the irradiation step, free radicals can be generated in both the composition and substrate. Free radicals in the composition can initiate polymerization of 4-acryloylmorpholine, and optionally other polymerizable monomers present, and the resultant monomeric, oligomeric, and polymeric active free radical species can couple with free radical sites on the substrate.

In the present disclosure, the ionizing radiation is selected from e-beam, x-ray, and/or gamma radiation. These radiation sources are able to penetrate through solids, such that the fluoropolymer substrate would not act as a mask during the irradiation. This is particularly advantageous when surface-treating a porous fluoroplastic substrate comprising a complicated network of pores. The radiation source may be selected depending on the application. For example, E-beam uses accelerated electrons while gamma irradiation uses radioisotope-generated gamma rays in a continuous exposure mode. Thus gamma is more penetrating in irradiation than e-beam and is more suited for irradiating denser materials. As e-beam is powered by electricity, it can provide significantly higher irradiation dose rate and therefore require significantly less time. E-beam is perhaps better suited for continuous or semi-continuous web-based process while gamma can treat dense and bulky materials. X-ray is similar to gamma although the radiation is generated in a different manner. Gamma involves radioactive decay while x-rays are Bremstrahlung radiation generated from accelerating electrons into a metal target. X-ray tubes generally emit slightly longer wavelengths and lower photon energies than a gamma source. Depending on product density, product packaging, and/or desired processing mode, one irradiation method may be selected over the other. For example, e-beam irradiation provides significantly higher dose rates and therefore requires significantly less irradiation time than gamma irradiation. Thus, e-beam irradiation is more suited for continuous or semi-continuous web-based processes than gamma irradiation. Gamma irradiation may be more suited for batch processes and the surface treatment of large objects or a collection of objects that is voluminous.

In the irradiation step, the fluoroplastic substrate (or fluoroplastic substrate comprising the composition) is exposed to ionizing radiation inside a chamber. The chamber may contain at least one source capable of providing a sufficient dose of radiation. A single source is typically capable of providing a sufficient dose of radiation, although two or more sources and/or multiple passes through a single source may be used.

Dose is the total amount of energy absorbed per mass unit. Dose is commonly expressed in kilograys (kGy). A Gray is defined as the amount of radiation required to supply 1 joule of energy per kilogram of mass.

Generally, the fluoroplastic substrate is purged (e.g. for two minutes or more) of oxygen using nitrogen or another inert gas because oxygen inhibits free-radical polymerization. The chamber is also often purged of oxygen using an inert gas. This purging can facilitate polymerization and high conversion in a desired period of time. A higher dose rate or a longer exposure time would be needed to achieve a similar degree of polymerization absent purging if a significant amount of oxygen were present. Both of which could impair or diminish the bulk mechanical properties of the fluoroplastic substrate. Exposing the irradiated substrate to the standard atmosphere quenches all free radicals at the surface of the substrate and prohibits grafting of the monomer(s). However, purging is not necessary when the substrate is isolated to exclude addition of oxygen during irradiation. For example, the fluoroplastic substrate may be sandwiched between oxygen barrier films. While exclusion of all oxygen is desirable, in practice, a minimal amount of oxygen is present.

In one embodiment, the fluoroplastic substrate comprising the composition is positioned in proximity to an irradiation source. Preferably the fluoroplastic substrate is irradiated in a substantially uniform manner by proper positioning of the source(s) in relation to the substrate, or agitating several substrates or objects during irradiation.

Electron beams (e-beams) are generally produced by applying high voltage to tungsten wire filaments retained between a repeller plate and an extractor grid within a vacuum chamber maintained at about $10^{-6}$ Torr. The filaments are heated at high current to produce electrons. The electrons are guided and accelerated by the repeller plate and extractor grid towards a thin window of metal foil. The accelerated electrons, traveling at speeds in excess of $10^7$ meters/second (m/sec) and possessing about 150 to 300 kilo-electron volts (keV), pass out of the vacuum chamber through the foil window and penetrate whatever material is positioned immediately beyond the foil window.

The quantity of electrons generated is directly related to the extractor grid voltage. As extractor grid voltage is increased, the quantities of electrons drawn from the tungsten wire filaments increase. E-beam processing can be extremely precise when under computer control, such that an exact dose and dose rate of electrons can be directed toward the fluoroplastic substrate (or fluoroplastic substrate comprising the composition).

Electron beam generators are commercially available from a variety of sources, including the ESI "ELECTROCURE" EB SYSTEM from Energy Sciences, Inc. (Wilmington, Mass.), and the BROADBEAM EB PROCESSOR from PCT Engineered Systems, LLC (Davenport, Iowa). For any given piece of equipment and irradiation sample location, the dosage delivered can be measured in accordance with ASTM E-1275 entitled "Practice for Use of a Radiochromic Film Dosimetry System." By altering extractor grid voltage, beam current, beam diameter and/or distance to the source, various dose rates can be obtained. Typical dose rates may range from 0.03 to 1000 kGy/sec.

Dose for the e-beam are dependent upon a number of processing parameters, including voltage, speed, and beam current. Dose can be conveniently regulated by controlling line speed, and the current supplied to the extractor grid. A target dose (e.g., 20 kGy) can be conveniently calculated by multiplying an experimentally measured coefficient (a machine constant) by the beam current and dividing by the web speed to determine the exposure. The machine constant varies as a function of beam voltage.

In one embodiment, using an e-beam radiation source, a controlled amount of dosage ranging from a minimum dosage of about 10 kilograys (kGy) to a maximum dosage of about 100 kGy is delivered. Typically, the total controlled amount of dosage ranges from about 20 kGy to about 60 kGy.

Generally, suitable gamma ray sources emit gamma rays having energies of 400 keV or greater. Typically, suitable gamma ray sources emit gamma rays having energies in the range of 500 keV to 5 MeV. Examples of suitable gamma ray sources include cobalt-60 isotope (which emits photons with energies of approximately 1.17 and 1.33 MeV in nearly equal proportions) and cesium-137 isotope (which emits photons with energies of approximately 0.662 MeV). The distance from the source can be fixed or made variable by changing the position of the target or the source. The flux of gamma rays emitted from the source generally decays with the square of the distance from the source and duration of time as governed by the half-life of the isotope. In general, the dose rate is determined by the source strength at the time of irradiation and the distance from the source to the target (e.g. fluoroplastic substrate). Typical dose rates may range from 0.000003 to 0.03 kGy/sec.

Once a dose rate has been established, the absorbed dose is accumulated over a period of time. During this period of time, the dose rate may vary if the fluoroplastic substrate (or fluoroplastic substrate comprising the composition) is in motion or other absorbing objects pass between the source and sample. For any given piece of equipment and irradiation sample location, the dosage delivered can be measured in accordance with ASTM E-1702 entitled "Practice for Dosimetry in a Gamma Irradiation Facility for Radiation Processing". Dosimetry may be determined per ASTM E-1275 entitled "Practice for Use of a Radiochromic Film Dosimetry System" using GEX B3 thin film dosimeters. Typical doses range from 1 to 50 kGy.

The total dose of gamma radiation received by the fluoroplastic substrate (or fluoroplastic substrate comprising the composition) depends on a number of parameters including source activity, residence time (i.e. the total time the sample is irradiated), the distance from the source, and attenuation by the intervening cross-section of materials between the source and sample. Dose is typically regulated by controlling residence time, distance to the source, or both.

The total dose of ionizing radiation (e-beam, x-ray, or gamma) received by the fluoroplastic substrate (or fluoroplastic substrate comprising the composition) can affect the extent of polymerization. The dose needed for polymerization depends on a variety of factors including, for example, the materials used, the concentration of monomers in the composition, the presence and amount of chain transfer agent, the presence and amount of free radical inhibitors or free radical scavengers present, such as dissolved oxygen, the physical dimensions of the substrate and arrangement of substrates, and the desired properties.

Generally, doses in the range of about 1 to 100 kGy and dose rates in the range of 0.000003 to 1000 kGy/sec are suitable. However, no limitations are placed on the dose or dose rate. Total dose requirement for any given composition will vary as a function of the dose rate. Higher dose rates typically result in faster chain termination and more ungrafted polymer formation. Thus, a dose rate can be selected based on desired properties for a specified composition.

Once the fluoroplastic substrate (or fluoroplastic substrate comprising the composition) has been irradiated to a desired dose, the substrate bearing grafted polymer groups may be optionally rinsed and/or heated to remove ungrafted materials. In the optional rinsing step, the surface-treated fluoroplastic substrate is washed or rinsed one or more times to remove any unreacted monomers, ungrafted polymer, solvent or other reaction by-products. Typically, the surface-treated fluoroplastic substrate is washed or rinsed up to three times using a water rinse, an alcohol rinse, a combination of water and alcohol rinses, and/or a solvent rinse (e.g. acetone, methyl ethyl ketone, etc). When an alcohol rinse is used, the rinse may include one or more alcohols including, but not limited to, isopropanol, methanol, ethanol, or any other alcohol that is practical to use and an effective solvent for any residual monomer. In each rinse step, the surface-treated fluoroplastic substrate may pass through a rinse bath or a rinse spray.

In one embodiment, the method further comprises an optional drying step, the surface-treated fluoroplastic substrate is dried to remove any rinse solution. Typically, the surface-treated substrate is dried in oven having a relatively low oven temperature for a desired period of time. Oven temperatures typically range from about 60° C. to about 120° C., while oven dwell times typically range from about 120 to about 600 seconds. Any conventional oven may be used in the optional drying step. It should also be noted that in other embodiments the drying step can proceed before the rinsing step to eliminate volatile components before extraction of non-grafted residue. Following the optional drying step, the dried surface-treated fluoroplastic substrate can be taken up in roll form to be stored for future use.

In one embodiment, additional process steps may be used, including, but are not limited to, a reaction step or a coating step wherein a coating composition is applied to the surface-treated fluoroplastic substrate. For example, a lamination step wherein one or more additional layers are temporarily or permanently joined to the surface-treated fluoroplastic substrate, an assembling step wherein the surface-treated fluoroplastic substrate is combined with one or more additional components to form a finished product (e.g., a filter assembly), a packaging step the surface-treated fluoroplastic substrate or a finished product comprising the surface-treated fluoroplastic substrate is packaged within a desired packaging material (e.g., a polyethylene film or bag), or any combination thereof.

By following the methods disclosed herein, monomers and/or interpolymerized monomer units (i.e., monomers that are polymerized together to form a polymer backbone) of 4-acryloylmorpholine, which optionally may include second monomers, are grafted onto the surface of the fluoroplastic substrate, altering the properties of the surface-treated fluoroplastic substrate, e.g., making it hydrophilic.

The present disclosure reduces or eliminates many of the known problems associated with fluoroplastic substrates including, but not limited to, for example wetting issues, and reduced flux. Because the surface treatment is covalently bonded to the fluoroplastic substrate, it is more durable than surface treatments that may just be in physical contact. In addition, the amide linkage of the 4-acryloylmorpholine is more resistant to hydrolysis than ester linkages present in surface treatments comprising (meth)acrylates. The present disclosure also enables the formation of surface-treated substrates having various degrees of hydrophilicity depending on the materials and steps used to form a given surface-treated fluoroplastic substrate.

The grafting of monomers including 4-acryloylmorpholine to the surface of the fluoroplastic substrate enhances the hydrophilicity of an otherwise hydrophobic substrate.

In one embodiment, the resulting surface-treated fluoroplastic substrate has a critical surface tension of at least 45, 50, 55, 60, 65, or even 70 dyne/cm.

In one embodiment, the resulting surface-treated, porous fluoroplastic substrate has a "critical wetting surface tension" (CWST) of at least 10 dynes/cm, at least 15 dynes/cm or even at least 20 dynes/cm, greater than the non-surface treated fluoroplastic substrate. By "critical wetting surface tension" (CWST) is meant the surface tension of a liquid that would just penetrate or be absorbed into a porous substrate, with any slight increase in the surface tension of the liquid causing it to not penetrate or be absorbed into the substrate. The CWST of a porous substrate may be measured using the Critical Wetting Surface Tension (CWST)—Penetrating Drop method described herein, whereby a series of test solutions of increasing surface tension is applied to the samples until a solution of such high surface tension is used that it no longer penetrates the substrate. The surface tension of the previously used solution is then recorded as the CWST of the substrate.

In one embodiment of the present disclosure, the surface-treated fluoroplastic substrate is porous and has a water flux (flowrate divided by lateral area) that is greater than zero, and the water flux of the surface-treated fluoroplastic substrate is maintained or greater than the initial water flux of the untreated porous fluoroplastic substrate.

One method of measuring the water flux of a given surface-treated fluoroplastic substrate or porous untreated fluoroplastic substrate is to measure the amount of time necessary for a quantity of water to flow through a surface-treated porous fluoroplastic substrate or untreated porous fluoroplastic substrate of the same lateral dimensions or area at a constant temperature and pressure. A decrease in the amount of time necessary for a quantity of water at a constant temperature and pressure to flow through a given surface-treated fluoroplastic substrate compared to the corresponding fluoroplastic substrate prior to surface modification indicates an increase in the water flux of the surface-treated fluoroplastic substrate. Advantageously, in one embodiment the method of the present disclosure improves not only the hydrophilicity of the fluoroplastic substrate, but also maintains or improves the flux.

In one embodiment, the resulting surface-treated fluoroplastic substrate has a water static contact angle of at least 15 degrees, 25 degrees, 30 degrees, 40 degrees, 50 degrees, or even 60 degrees less than the untreated fluoroplastic substrate.

In one embodiment, when the surface-treated fluoroplastic substrates of the present disclosure are porous, they may be particularly suited as filter media. For examples, the surface-treated fluoroplastic substrates of the present disclosure may be used in the filtering of liquid, specifically aqueous solutions. As the polymer is grafted to render it hydrophilic, the hydrophilicity is durable.

In one embodiment of the present disclosure, the surface-treated fluoroplastic substrates of the present disclosure may be used in microfiltration (i.e., retaining particles with particle sizes in the range of 0.1 to 10 micrometers) or ultrafiltration (i.e., retaining particles with particle sizes in the range of 2 to 100 nanometers) applications.

Exemplary embodiments of the present invention are described below:

Embodiment 1

A method of treating a fluoroplastic substrate comprising:
(a) providing a fluoroplastic substrate comprising a polymer having a structural unit selected from —CHF—, —CH$_2$CF$_2$—, or —CF$_2$CH$_2$—;
(b) contacting the fluoroplastic substrate with a composition comprising 4-acryloylmorpholine; and
(c) exposing the fluoroplastic substrate to a controlled amount of ionizing radiation selected from at least one of: e-beam, x-ray, and gamma radiation so as to form a surface treatment on the fluoroplastic substrate comprising a grafted, radiation-initiated reaction product of the composition attached to the surfaces of the fluoroplastic substrate.

Embodiment 2

The method of embodiment 1, wherein the fluoroplastic substrate is first contacted with the composition and then exposed to the controlled amount of radiation.

Embodiment 3

The method of embodiment 1, wherein the fluoroplastic substrate is first exposed to the controlled amount of radiation and then contacted with the composition.

Embodiment 4

The method of any one of the previous embodiments, wherein the composition further comprises diacetone acrylamide.

Embodiment 5

The method of any one of the previous embodiments, wherein the fluoroplastic substrate comprises a series of interconnected pores from a first major surface to an opposing second major surface.

Embodiment 6

The method of embodiment 5, wherein the fluoroplastic substrate is a porous membrane with a symmetric, asymmetrically, or a multizone porous structure.

Embodiment 7

The method of any one of the previous embodiments, wherein the fluoroplastic substrate is selected from a thermally-induced phase separation (TIPS) membrane, a solvent-induced phase separation (SIPS) membrane, or a combination thereof.

Embodiment 8

The method of any one of embodiments 1-7, wherein the fluoroplastic substrate is a non-woven.

Embodiment 9

The method of any one of the previous embodiments, wherein the fluoroplastic substrate is selected from at least one of a homopolymer of vinyl fluoride; a homopolymer of vinylidene fluoride; a copolymer comprising vinylidene fluoride; a copolymer of ethylene and chlorotrifluoroethylene; a copolymer of ethylene and tetrafluoroethylene; a copolymer of vinylidene fluoride and chlorotrifluoroethylene; and a copolymer of vinylidene fluoride, hexafluoropropylene, and tetrafluoroethylene.

Embodiment 10

The method of any one of the previous embodiments, wherein the composition further comprises methanol.

Embodiment 11

A surface-treated fluoroplastic substrate made from the method of any one of the previous embodiments.

Embodiment 12

An article comprising:
a porous fluoroplastic substrate comprising a polymer having structural unit selected from —CHF—, —CH$_2$CF$_2$—, or —CF$_2$CH$_2$— and having interstitial and outer surfaces; and
a surface-treatment thereon the porous fluoroplastic substrate, wherein the surface-treatment is a grafted reaction product of a composition comprising 4-acryloylmorpholine.

Embodiment 13

The article of embodiment 12, wherein the pores are 5 nm to 30 micrometers in size.

Embodiment 14

The article of any one of embodiments 12-13, wherein the porous fluoroplastic substrate is a symmetric, asymmetrically, or a multizone porous structure.

Embodiment 15

The article of any one of embodiments 12-14, further comprising an additional layer, wherein the additional layer is porous and is in direct contact with the article.

Embodiment 16

The article of embodiment 15, wherein the additional layer is a non-woven.

Embodiment 17

The article of any one of embodiments 15-16, wherein the pores of the additional layer are larger than the pores of the fluoroplastic substrate.

Embodiment 18

The article of any one of embodiments 12-17, wherein the composition further comprises a second monomer.

Embodiment 19

The article of embodiment 18, wherein the second monomer is diacetone acrylamide.

Embodiment 20

The article of any one of embodiments 12-19, wherein the fluoroplastic substrate is not poly(vinylidene fluoride).

Embodiment 21

The article of any one of embodiments 12-19, wherein the porous fluoroplastic substrate is a non-woven.

Embodiment 22

The article of any one of embodiments 12-19, wherein the porous fluoroplastic substrate is selected from a thermally-induced phase separation (TIPS) membrane, a solvent-induced phase separation (SIPS) membrane, or a combination thereof.

Embodiment 23

An article comprising:
a fluoroplastic substrate comprising a polymer having a structural unit selected from —CHF—, —CH$_2$CF$_2$—, or —CF$_2$CH$_2$— and wherein the fluoroplastic substrate is not poly(vinylidene fluoride); and
a surface-treatment thereon the fluoroplastic substrate, wherein the surface-treatment is a grafted reaction product of a composition comprising 4-acryloylmorpholine.

Embodiment 24

The article of embodiment 23, wherein the composition further comprises a second monomer.

Embodiment 25

The article of embodiment 24, wherein the second monomer is diacetone acrylamide.

Embodiment 26

The article of any one of embodiments 23-25, further comprising an additional layer, wherein the additional layer is in direct contact with the article.

Embodiment 27

The article of embodiment 26, wherein the surface-treated side of the fluoroplastic substrate is in direct contact with the additional layer.

Embodiment 28

The article of embodiment 26, wherein the surface-treated side of the fluoroplastic substrate is not in direct contact with the additional layer.

Embodiment 29

An article comprising:
a fluoroplastic substrate comprising a polymer having a structural unit selected from —CHF—, —CH$_2$CF$_2$—, or —CF$_2$CH$_2$—; and
a surface-treatment thereon the fluoroplastic substrate, wherein the surface-treatment is a grafted reaction product of a composition comprising 4-acryloylmorpholine and a second monomer.

Embodiment 30

The article of embodiment 29, wherein the second monomer is diacetone acrylamide.

Embodiment 31

The article of any one of embodiments 29-30, wherein the fluoroplastic substrate is a porous fluoroplastic substrate.

Embodiment 32

The article of embodiment 31, wherein the pores are 5 nm to 30 micrometers in size.

Embodiment 33

The article of any one of embodiments 31-32, wherein the fluoroplastic substrate is a symmetric, asymmetrically, or a multizone porous structure.

Embodiment 34

The article of any one of embodiments 29-33, further comprising an additional layer, wherein the additional layer is in direct contact with the article.

Embodiment 35

The article of embodiment 34, wherein the additional layer is a porous substrate.

Embodiment 36

The article of 35, wherein the porous substrate is a non-woven.

Embodiment 37

A method of filtering a liquid comprising:
contacting a liquid to the surface-treated fluoroplastic substrate according to embodiment 11.

Embodiment 38

The method of embodiment 37, wherein the liquid comprises water.

Embodiment 39

A method of filtering a liquid comprising:
contacting a liquid to the article according to any one of embodiments 23-36.

Embodiment 40

A graft copolymer composition comprising a fluoropolymer that is grafted to at least one of: a monomer, an oligomer, and a polymer formed from a monomer comprising 4-acryloylmorpholine; wherein the fluoropolymer is formed from monomers comprising (i) ethylene and chlorotrifluoroethylene, (ii) ethylene and tetrafluoroethylene, (iii) vinylidene fluoride and chlorotrifluoroethylene, or (iv) tetrafluoroethylene, hexafluoropropylene, and vinylidene fluoride.

The present invention is described above and further illustrated below by way of examples, which are not to be construed in any way as imposing limitations upon the scope of the invention. On the contrary, it is to be clearly understood that resort may be had to various other embodiments, modifications, and equivalents thereof which, after reading the description herein, may suggest themselves to those skilled in the art without departing from the spirit of the present invention and/or the scope of the appended claims.

EXAMPLES

Advantages and embodiments of this disclosure are further illustrated by the following examples, but the particular materials and amounts thereof recited in these examples, as well as other conditions and details, should not be construed to unduly limit this invention. In these examples, all percentages, proportions and ratios are by weight unless otherwise indicated.

All materials are commercially available, for example from Sigma-Aldrich Chemical Company; Milwaukee, Wis., or known to those skilled in the art unless otherwise stated or apparent. Materials (monomers and solvents) were used as received unless indicated otherwise.

These abbreviations are used in the following examples: g=gram, kg=kilograms, min=minutes, mol=mole; cm=centimeter, mm=millimeter, ml=milliliter, L=liter, psi=pressure per square inch, MPa=megaPascals, s=second; vol=volume; and wt=weight.

Test Methods

Critical Wetting Surface Tension (CWST)—Penetrating Drop Method

The critical wetting surface tension of the samples was determined by use of the penetrating drop method outlined in Journal of Membrane Science, 33, 315-328 (1987) "Wetting Criteria for the Applicability of Membrane Distillation" as follows. A series of test solutions of increasing surface tension up to 72 dyne/cm (available under the trade designation "DYNE TEST SOLUTIONS" available from Jemmco LLC., Mequon, Wis.) were applied at increasing surface tensions to the samples. As the CWST was approached, test solutions at 1 dyne/cm interval were used until a test solution no longer penetrated or absorbed into the membrane, but beaded up on the sample surface and remained beaded up for at least about 2 seconds. The surface tension of the test solution tested just prior to this beaded up test solution was then recorded as the CWST. If the test solution of highest surface tension, 72 dyne/cm, penetrated the sample and did not bead up, then the CWST was recorded as >72 dyne/cm, i.e., greater than 72 dyne/cm.

Inverse Flow Rate

The amount of time it took for 100 ml deionized water to pass through the membrane was conducted as follows. A circular disk of the membrane having a diameter of approximately 47 mm was punched out from the 14 cm×16 cm membrane sample, and placed in a Model 4238 Pall Gelman magnetic filter holder (available from Pall Corp., East Hills, N.Y.). The filter holder was then placed on a filter flask that was attached to a vacuum pump. A vacuum gauge was used to monitor the vacuum. 250 ml of deionized water were placed in the filter holder over the membrane and then a vacuum of 23 inches of mercury (584 mm Hg) was applied. After the first 50 ml of water had passed through the membrane, the time was recorded for the next 100 ml of water to pass through the membrane and reported as Time.

Bubble Point Pore Size

The bubble point pore size can be measured using a forward flow bubble point pressure apparatus as follows. A disc of the membrane is saturated with a mixture of 60 vol % isopropyl alcohol and 40 vol % water and mount in a 90 mm diameter membrane holder. A pressure controller (Type 640, available from MKS Instruments, Inc.) can be used to regulate the supply of nitrogen gas to the upstream side of the membrane. The mass flow of gas downstream of the membrane is measured using a mass flow meter (available under the trade designation "MASS-FLO" meter, model no. 179A12CS3BM, from MKS Instruments, Inc.). At the beginning of the test, nitrogen gas is supplied to the upstream side of the membrane at a pressure of 10.3 kPa (1.5 psi). The pressure is then raised by increments of 1.38 kPa (0.2 psi) every 0.2 second. This results in a measured mass flow downstream of the membrane that is initially roughly constant at a value representative of the rate of diffusional flow of nitrogen through the liquid-filled pores of the membrane, followed by a monotonic increase in the measured mass flow as liquid is displaced from the pores. The bubble point pressure of the membrane is taken as the applied nitrogen pressure at the onset of the monotonic increase in measured mass flow. The bubble point pressure of a membrane is inversely related to the largest pore size in the pore size distribution, or the bubble point pore size, according to the LaPlace equation.

Porosity

The porosity of the membrane was determined by weighing a sample of measured lateral area and thickness. The weight of the identical volume (from the lateral area and thickness of the membrane) of pure polymer was calculated from the density of the pure polymer. The porosity was calculated by the following equation:

Porosity (%)=100−100×[wt. of membrane with volume $Y$/wt. of polymer with volume $Y$]

Hansen Solubility Parameters

Hansen solubility parameters were calculated using the parameterized method of Hansen described in "Hansen Solubility Parameters: A User's Handbook" by Charles M. Hansen, copyright 2000, CRC Press LLC (New York).

Materials

AMP—4-Acryloylmorpholine, Sigma-Aldrich, Milwaukee Wis.

Betaine—N,N-dimethyl-N-(3-sulfopropyl)-3'-methacryloylaminopropanaminium inner salt, Sigma-Aldrich DAA—Diacetone Acrylamide, Sigma Aldrich ECTFE—a copolymer of ethylene and chlorotrifluoroethylene (available under the trade designation "HALAR 902 ECTFE" from Solvay Specialty Polymers; Thorofare N.J.)

ETFE—a copolymer of ethylene and tetrafluoroethylene (available under the trade designation "3M DYNEON FLUOROPLASTIC ET 6235" from 3M Co., St. Paul Minn.)

FEP—a copolymer of tetrafluoroethylene and hexafluoropropylene, which can be available under the trade designation "3M DYNEON FEP" from 3M Company HEA—N-(2-Hydroxyethyl)acrylamide, Sigma Aldrich Methanol—methanol OmniSolv High Purity Solvent available from EMD Chemicals, Inc., Gibbstown N.J.

MPA—N-(3-Methoxypropyl)acrylamide, Sigma-Aldrich

NVP—N-Vinylpyrrolidone, Sigma Aldrich

PVDF—a homopolymer of vinylidene fluoride, high molecular weight grade, available under the trade designation "DYNEON PVDF 1012/0001" from 3M Company THV 500—a polymer of tetrafluoroethylene, hexafluoropropylene, and vinylidene fluoride (available under the trade designation "3M DYNEON FLUOROPLASTIC 500" from 3M Company, St. Paul Minn.)

THV 610—a polymer of tetrafluoroethylene, hexafluoropropylene, and vinylidene fluoride (available under the trade designation "3M DYNEON FLUOROPLASTIC 610" from 3M Company, St. Paul Minn.)

Preparation of Substrates

Porous Membrane I was prepared with a TIPS process using ECTFE according to U.S. Patent Publication No. 2011/0244013 (Mrozinski et al.). The membrane had a thickness of approximately 50 microns (2 mils), a Bubble Point Pore Size of 280 nanometers and a Porosity of 64%.

Porous Membrane II was prepared with a TIPS process using PVDF according to U.S. Pat. No. 7,338,692 (Smith et al.). The membrane had a thickness of approximately 115 microns (4.6 mils), a Bubble Point Pore Size of 1200 nanometers and a Porosity of 67%.

Nonporous film III was prepared with ECTFE by melt pressing the pellets at approximately 250° C. to form a film having a thickness of approximately 250 microns (10 mils).

Nonporous films IV, V, VI and VII were prepared by extruding resin pellets THV 500, THV 610, ETFE, and FEP, respectively, according to the manufacturer's recommendations for processing. The films were the following approximate thicknesses: THV 500 was 100 μm (4 mils); THV 610 was 25 μm (1 mil); ETFE was 250 μm (10 mils); and FEP was 25 μm (1 mil).

Preparation of Treated Substrates

Porous membrane (approximately 14 cm×16 cm) or nonporous film (approximately 10 cm×12 cm) were placed between two slightly larger sheets of 100 micron (4 mil) thick polyethylene terephthalate (PET) film, and the PET films taped together on one side. This sandwich was then opened and the substrate was wetted with a 25 wt. % monomer(s) in methanol solution, and the sandwich reclosed. Trapped air bubbles were removed and excess liquid squeezed out by applying a plastic roller over the surface of the sandwich. The web pathway through the electron beam processor was under a constant nitrogen purge such that the oxygen level was 30 to 50 ppm, or less. Approximately 5-10 min after the substrate was contacted with the solution, the sandwich was conveyed through an electron beam processor (ESI CB-300 Electrocurtain electron beam system, Energy Systems, Inc., Wilmington, Mass.) at a speed of about 21 feet per minute and at a voltage of 240 KeV with sufficient beam current applied to the cathode to deliver a dose of 4 Mrad (40 kGy). The web pathway through the electron beam processor was still under the nitrogen purge. The beam was calibrated using thin film dosimeters. After about more than 30 minutes following irradiation with the e-beam, the treated substrates were removed from between the PET and washed by placing in four sequential baths of deionized water, deionized water, deionized water, and lastly methanol for approximately 4-6 minutes per bath. The treated substrates were allowed to air dry for at least 5 days and then the samples were tested for "Critical Wetting Surface Tension" and "Inverse Flow Rate" following the test methods described above.

Example 1 and Comparative Examples C1-C6

Treated membranes (Example 1 and Comparative Examples C2-C6) were prepared by according to the "Preparation of Treated Substrates" procedure described above using Porous Membrane I and 25 wt % solutions of the monomers shown in Table 1. The resulting membranes and an untreated membrane of Porous Membrane I (Comparative Example C1) were tested for CWST and Inverse Flow Rate. The results are shown in Table 1.

TABLE 1

| Example | Monomer | Hansen Solubility parameter (MPa$^{0.5}$) | CWST (dyne/cm) | Time (s) |
| --- | --- | --- | --- | --- |
| 1 | AMP | 23.4 | 62 | 81 |
| C1 | None | | 37 | 123 |
| C2 | NVP | 26.6 | 45 | 85 |
| C3 | MPA | 20.9 | 44 | 77 |
| C4 | Betaine | NC | 40 | 87 |
| C5 | DAA | 20.9 | 52 | 100 |
| C6 | HEA | 28.5 | 53 | 132 |

NC = not calculated—a zwitterionic compound

Examples 2-8, Comparative Examples C7-C8

Treated membranes were prepared by the "Preparation of Treated Substrates" process described above using Porous Membrane I and 25 wt % solutions of the monomer or monomer mixtures shown in Table 2. The resulting membranes were tested for CWST and Inverse Flow Rate. The results are shown in Table 2.

TABLE 2

| Example | Monomers (wt. % based on total wt. of monomers) | CWST (dyne/cm) | Time (s) |
| --- | --- | --- | --- |
| 2 | 100 AMP | 69 | 94 |
| 3 | 60/40 AMP/NVP | 61 | 88 |
| 4 | 40/60 AMP/NVP | 60 | 80 |
| C7 | 100 NVP | 42 | 93 |
| 5 | 80/20 AMP/HEA | 57 | 122 |
| 6 | 60/40 AMP/HEA | 55 | 93 |
| 7 | 40/60 AMP/HEA | 53 | 97 |

TABLE 2-continued

| Example | Monomers (wt. % based on total wt. of monomers) | CWST (dyne/cm) | Time (s) |
|---|---|---|---|
| 8 | 20/80 AMP/HEA | 58 | 101 |
| C8 | 100 HEA | 59 | 212 |

Examples 9-18 and Comparative Example C9

Treated membranes were prepared by the "Preparation of Treated Substrates" process described above using Porous Membrane I and 25 wt % solutions of the monomer or monomer mixtures shown in Table 3. The resulting membranes were tested for CWST and Inverse Flow Rate. The results are shown in Table 3.

TABLE 3

| Example | Monomers (Wt. AMP/Wt. DAA) | CWST (dyne/cm) | Time (s) |
|---|---|---|---|
| 9 | 100/0 | 69 | 123 |
| 10 | 90/10 | 71 | 110 |
| 11 | 80/20 | 71 | 115 |
| 12 | 70/30 | 71 | 140 |
| 13 | 60/40 | 71 | 102 |
| 14 | 50/50 | 65 | 96 |
| 15 | 40/60 | 70 | 103 |
| 16 | 30/70 | 67 | 114 |
| 17 | 20/80 | 57 | 109 |
| 18 | 10/90 | 58 | 112 |
| C9 | 0/100 | 56 | 115 |

Examples 19-20 and Comparative Example C10

Treated membranes were prepared by the "Preparation of Treated Substrates" process described above using Porous Membrane II and 25 wt % solutions of the monomer shown in Table 4. The treated membranes and an untreated membrane of Porous Membrane II (Comparative Example C10) were tested for CWST and Inverse Flow Rate. The results are shown in Table 4.

TABLE 4

| Example | MONOMER | CWST (dyne/cm) | Time (s) |
|---|---|---|---|
| C10 | NONE | 47 | 33 |
| 19 | AMP | >72 | 25 |
| 20 | AMP | >72 | 27 |

Examples 21-24 and Comparative Examples C11-C16

Nonporous Films III-VII were washed in isopropanol and allowed to air dry before treatment. Treated substrates (Examples 21-24 and Comparative Example 16) were prepared according to the "Preparation of Treated Substrates" procedure described above using Nonporous Films III-VII and a 25 wt. % solution of 4-acryloylmorpholine monomer. During treatment, the construction was passed through the e-beam with the surface of the nonporous film initially wetted with and contacting the 4-acryloylmorpholine monomer solution facing the e-beam source. Comparative examples C11-C15, were the untreated Nonporous Films III-VII, which were also washed in isopropanol and allowed to air dry before testing. Examples 21-24 and Comparative Examples C11-C16 were then tested for water static contact angles as follows. Four drops of deionized water each of approximately 2 microliters in volume were placed on the top surface of each film, the treated surface of the treated substrates, and the contact angles were measured using a goniometer. The results for each of the 4 sessile drops were averaged and are shown in Table 5.

TABLE 5

| Example | Nonporous film | Contact angle, degrees |
|---|---|---|
| C11 | III | 102.6 |
| 21 | III | 38.9 |
| C12 | IV | 97.9 |
| 22 | IV | 26.0 |
| C13 | V | 103.7 |
| 13 | V | 46.9 |
| C14 | VI | 96.8 |
| 24 | VI | 64.4 |
| C15 | VII | 110.5 |
| C16 | VII | 102.9 |

Foreseeable modifications and alterations of this invention will be apparent to those skilled in the art without departing from the scope and spirit of this invention. This invention should not be restricted to the embodiments that are set forth in this application for illustrative purposes. To the extent that there is a conflict or discrepancy between this specification and the disclosure in any document incorporated by reference herein, this specification will control.

What is claimed is:

1. An article comprising:
   a porous fluoroplastic substrate comprising at least one of
      a copolymer of ethylene and chlorotrifluoroethylene or
      a copolymer of ethylene and tetrafluoroethylene and
      having interstitial and outer surfaces; and
   a surface-treatment comprising 4-acryloylmorpholine directly grafted to said surfaces.

2. The article of claim 1, wherein the pores of the porous fluoroplastic substrate are 5 nm to 30 micrometers in size.

3. The article of claim 1, further comprising an additional layer, wherein the additional layer is porous and is in direct contact with the article.

4. The article of claim 3, wherein the pores of the additional layer are larger than the pores of the fluoroplastic substrate.

5. The article of claim 1, wherein the porous fluoroplastic substrate is not poly(vinylidene fluoride).

6. The article of claim 1, wherein the surface-treatment is a grafted reaction product of a composition comprising 4-acryloylmorpholine and a second monomer.

7. The article of claim 6, wherein the second monomer is diacetone acrylamide.

8. The article of claim 1, wherein the porous fluoroplastic substrate is a symmetric, asymmetric, or a multizone porous structure.

9. The article of claim 1, wherein the porous fluoroplastic substrate is selected from a thermally-induced phase separation (TIPS) membrane and a solvent-induced phase separation (SIPS) membrane.

10. An article comprising:
   a fluoroplastic substrate comprising a polymer having a structural unit selected from —CHF—, —CH$_2$CF$_2$—, or CF$_2$CH$_2$— and wherein the fluoroplastic substrate is not poly(vinylidene fluoride); and
   a surface-treatment comprising 4-acryloylmorpholine directly grafted to the fluoroplastic substrate.

11. The article of claim 10, wherein the surface-treatment is a grafted reaction product of a composition comprising 4-acryloylmorpholine a second monomer.

12. The article of claim 11, wherein the second monomer is diacetone acrylamide.

13. The article of claim 10, further comprising an additional layer, wherein the additional layer is in direct contact with the article.

14. An article comprising:
a fluoroplastic substrate comprising a polymer having a structural unit selected from —CHF—, —CH$_2$CF$_2$—, or —CF$_2$CH$_2$—; and
a surface-treatment thereon the fluoroplastic substrate, wherein the surface-treatment is a grafted reaction product of a composition comprising 4-acryloylmorpholine and a second monomer, wherein the 4-acryloylmorpholine is directly grafted to the fluoroplastic substrate.

15. The article of claim 14, wherein the second monomer is diacetone acrylamide.

16. The article of claim 14, wherein the fluoroplastic substrate is a porous fluoroplastic substrate.

17. The article of claim 14, further comprising an additional layer, wherein the additional layer is in direct contact with the article.

18. The article of claim 14, wherein the fluoropolymer is formed from monomers comprising (i) ethylene and chlorotrifluoroethylene, (ii) ethylene and tetrafluoroethylene, (iii) vinylidene fluoride and chlorotrifluoroethylene, or (iv) tetrafluoroethylene, hexafluoropropylene, and vinylidene fluoride.

19. The article of claim 1, wherein the surface-treated fluoroplastic substrate has at least one of the following characteristics:
a critical surface tension of at least 45 dyne/cm;
a critical wetting surface tension of at least 10 dynes/cm greater than the untreated fluoroplastic substrate;
a water flux greater than zero; and
a water flux that is greater than the initial water flux of the untreated fluoroplastic substrate.

20. A porous fluoroplastic substrate comprising at least one of a copolymer of ethylene and chlorotrifluoroethylene or a copolymer of ethylene and tetrafluoroethylene, having interstitial and outer surfaces, and 4-acryloylmorpholine grafted to said surfaces, made by a method comprising:
providing a fluoroplastic substrate comprising at least one of a copolymer of ethylene and chlorotrifluoroethylene or a copolymer of ethylene and tetrafluoroethylene and having interstitial and outer surfaces;
contacting the fluoroplastic substrate with a composition comprising 4-acryloylmorpholine; and
exposing the fluoroplastic substrate to a controlled amount of ionizing radiation so as to form a surface treatment on the fluoroplastic substrate comprising a grafted, radiation-initiated reaction product of the composition attached to the surfaces of the fluoroplastic substrate.

21. The porous fluoroplastic of claim 20, wherein the fluoroplastic substrate is first contacted with the composition and then exposed to the controlled amount of radiation.

22. The article of claim 20, wherein the surface-treated fluoroplastic substrate has at least one of the following characteristics:
a critical surface tension of at least 45 dyne/cm;
a critical wetting surface tension of at least 10 dynes/cm greater than the untreated fluoroplastic substrate;
a water flux greater than zero; and
a water flux that is greater than the initial water flux of the untreated fluoroplastic substrate.

23. A fluoroplastic substrate comprising a polymer having a structural unit selected from —CHF—, —CH$_2$CF$_2$—, or —CF$_2$CH$_2$—, and 4-acryloylmorpholine grafted to the fluoroplastic substrate, made by a method comprising:
providing a fluoroplastic substrate comprising a polymer having a structural unit selected from —CHF—, —CH$_2$CF$_2$—, or —CF$_2$CH$_2$;
contacting the fluoroplastic substrate with a composition comprising 4-acryloylmorpholine and a second monomer; and
exposing the fluoroplastic substrate to a controlled amount of ionizing radiation so as to form a surface treatment on the fluoroplastic substrate comprising a grafted, radiation-initiated reaction product of the composition attached to the surfaces of the fluoroplastic substrate.

24. The fluoroplastic of claim 23, wherein the fluoroplastic substrate is first contacted with the composition and then exposed to the controlled amount of radiation.

25. The article of claim 23, wherein the surface-treated fluoroplastic substrate has at least one of the following characteristics:
a critical surface tension of at least 45 dyne/cm;
a critical wetting surface tension of at least 10 dynes/cm greater than the untreated fluoroplastic substrate;
a water flux greater than zero; and
a water flux that is greater than the initial water flux of the untreated fluoroplastic substrate.

* * * * *

UNITED STATES PATENT AND TRADEMARK OFFICE
CERTIFICATE OF CORRECTION

PATENT NO. : 10,450,433 B2
APPLICATION NO. : 15/895528
DATED : October 22, 2019
INVENTOR(S) : Robert Clough Page 1 of 1

It is certified that error appears in the above-identified patent and that said Letters Patent is hereby corrected as shown below:

On the Title Page

Column 2
Other Publications, Line 8, Delete "(vinvlidone" and insert -- (vinylidene --, therefor.

In the Specification

Column 1
Line 6, Delete "application" and insert -- Application --, therefor.
Line 50, After "substrate" insert -- . --.

Column 2
Line 55, Delete "and/ore-" and insert -- and/or e- --, therefor.

Column 7
Line 18, Delete "hydrophility" and insert -- hydrophilicity --, therefor.
Line 60, Delete "intersistial" and insert -- interstitial --, therefor.

Column 11
Line 6, Delete "Bremstrahlung" and insert -- Bremsstrahlung --, therefor.

In the Claims

Column 24
Line 64, In Claim 10, delete "$CF_2CH_2$-" and insert -- -$CF_2CH_2$- --, therefor.

Column 26
Line 12, In Claim 22, delete "article" and insert -- porous fluoroplastic substrate --, therefor.
Line 40, In Claim 25, delete "article" and insert -- fluoroplastic substrate --, therefor.

Signed and Sealed this
Tenth Day of December, 2019

Andrei Iancu
*Director of the United States Patent and Trademark Office*